US008619292B2

(12) United States Patent
Maekawa (10) Patent No.: US 8,619,292 B2
(45) Date of Patent: Dec. 31, 2013

(54) TERMINAL DEVICE FOR PRINTING DATA FROM THE INTERNET

(75) Inventor: Yohei Maekawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 335 days.

(21) Appl. No.: 12/873,056

(22) Filed: Aug. 31, 2010

(65) Prior Publication Data

US 2011/0075203 A1 Mar. 31, 2011

(30) Foreign Application Priority Data

Sep. 29, 2009 (JP) ................................ 2009-224052

(51) Int. Cl.
*G06F 3/12* (2006.01)

(52) U.S. Cl.
USPC ........... 358/1.15; 715/234; 715/700; 715/704

(58) Field of Classification Search
USPC .......................... 358/1.15; 715/704, 700, 736
See application file for complete search history.

(56) References Cited

U.S. PATENT DOCUMENTS

| 8,065,357 | B2 * | 11/2011 | Cocotis et al. | ............... 358/1.15 |
| 2002/0120742 | A1 | 8/2002 | Cherry | |
| 2002/0126306 | A1 | 9/2002 | Chohsa et al. | |
| 2002/0171857 | A1 | 11/2002 | Hisatomi et al. | |
| 2003/0090712 | A1 * | 5/2003 | Lenz et al. | ................... 358/1.15 |
| 2003/0137691 | A1 | 7/2003 | Tanaka | |
| 2005/0086282 | A1 | 4/2005 | Anderson et al. | |
| 2006/0279772 | A1 * | 12/2006 | Ludwig et al. | ............... 358/1.15 |
| 2008/0285078 | A1 * | 11/2008 | Kato | ............................ 358/1.15 |
| 2009/0083625 | A1 * | 3/2009 | Liu | ............................... 358/1.15 |
| 2010/0095208 | A1 * | 4/2010 | White et al. | .................. 715/704 |

FOREIGN PATENT DOCUMENTS

| EP | 1536319 A1 | 6/2005 |
| JP | H09-022335 A | 1/1997 |

(Continued)

OTHER PUBLICATIONS

European Patent Office, Extended European Search Report for European Patent Application No. 10008890.5 (counterpart European patent application), dated Aug. 30, 2012.
The State Intellectual Property Office of the People's Republic of China, Notification of First Office Action for Chinese Patent Application No. 201010505573.1 (counterpart Chinese patent application), issued Mar. 18, 2013.

(Continued)

*Primary Examiner* — Fan Zhang
*Assistant Examiner* — Juan M Guillermety
(74) *Attorney, Agent, or Firm* — Baker Botts L.L.P.

(57) ABSTRACT

A terminal device may comprise a memory configured to store a browser application including a first program and a second program, and a processor comprising a first processing unit and a second processing unit. The first processing unit configured to acquire specific data from the internet and display a browser screen including the specific data on a displaying unit, and the second processing unit configured to execute a process. The second processing unit may display a predetermined inputting portion on the browser screen, and acquire new specific data in a case where the predetermined inputting portion is operated. The new specific data may be transformed from the specific data being displayed on the browser screen. The new specific data may have a specific format that a specific printer can interpret. The second processing unit may send the new specific data to the specific printer.

9 Claims, 4 Drawing Sheets

(56) References Cited

FOREIGN PATENT DOCUMENTS

| | | |
|---|---|---|
| JP | 2003-036152 A | 2/2003 |
| JP | 2003-216367 A | 7/2003 |
| JP | 2004-145380 A | 5/2004 |
| JP | 2004-213275 A | 7/2004 |
| JP | 2007-148996 A | 6/2007 |
| JP | 2007-233685 A | 9/2007 |
| JP | 2002-264440 A | 9/2009 |

OTHER PUBLICATIONS

Japan Patent Office, Notification of Reasons for Rejection for Japanese Patent Application No. 2009-224052 (counterpart Japanese patent application), mailed Mar. 12, 2013.

Japan Patent Office, Notification of Reasons for Rejection for Japanese Patent Application No. 2009-224052 (counterpart to above-captioned patent application), mailed Jul. 30, 2013.

* cited by examiner

TERMINAL DEVICE FOR PRINTING DATA FROM THE INTERNET

CROSS-REFERENCE TO RELATED APPLICATIONS

This application claims priority to Japanese Patent Application No. 2009-224052, filed on Sep. 29, 2009, the contents of which are hereby incorporated by reference into the present application.

TECHNICAL FIELD

The technique disclosed in this specification relates to a terminal device configured to be connected with an internet.

DESCRIPTION OF THE RELATED ART

A printer driver stored in a host computer is known. The printer driver transforms character data into printer language. The printer driver sends the printer language that was transformed from the character data to the printer. The printer performs printing process according to the printer language.

SUMMARY

There are cases where a user wishes to print an image represented by data that is acquired from the internet and displayed on a browser screen. With conventional technique, the image cannot be printed unless the printer driver is used. This specification discloses technique that enables the printing of the image represented by the data that is displayed on the browser screen without having to use the printer driver.

One aspect of techniques disclosed in the present specification is terminal device to be connected with an internet. The terminal device may comprise a memory configured to store a browser application including a first program and a second program, and a processor comprising a first processing unit and a second processing unit. The first processing unit configured to acquire specific data from the internet in accordance with the first program and display a browser screen including the specific data on a displaying unit in accordance with the first program, and the second processing unit configured to execute a process in accordance with the second program. The second processing unit may comprise a first display processing unit, an acquiring unit, and an acquiring unit. The first display processing unit may be configured to display a predetermined inputting portion on the browser screen. The acquiring unit may be configured to acquire new specific data in a case where the predetermined inputting portion is operated. The new specific data may be transformed from the specific data being displayed on the browser screen, The new specific data may have a specific format that a specific printer can interpret. The sending unit may be configured to send the new specific data to the specific printer.

Another aspect of the technique disclosed herein may be as a program (that is, the second program) to be installed to the browser application as an extension program. Further, a non-transitory computer readable medium storing the program is also novel and useful. Incidentally, the control method and the browser application (that is, combination of the first program and the second program) for realizing the terminal device are also novel and useful. Moreover, the system including the terminal device and the specific printer is also novel and useful.

DETAILED DESCRIPTION OF THE PREFERRED EMBODIMENT

Configuration of System

Figure 1:
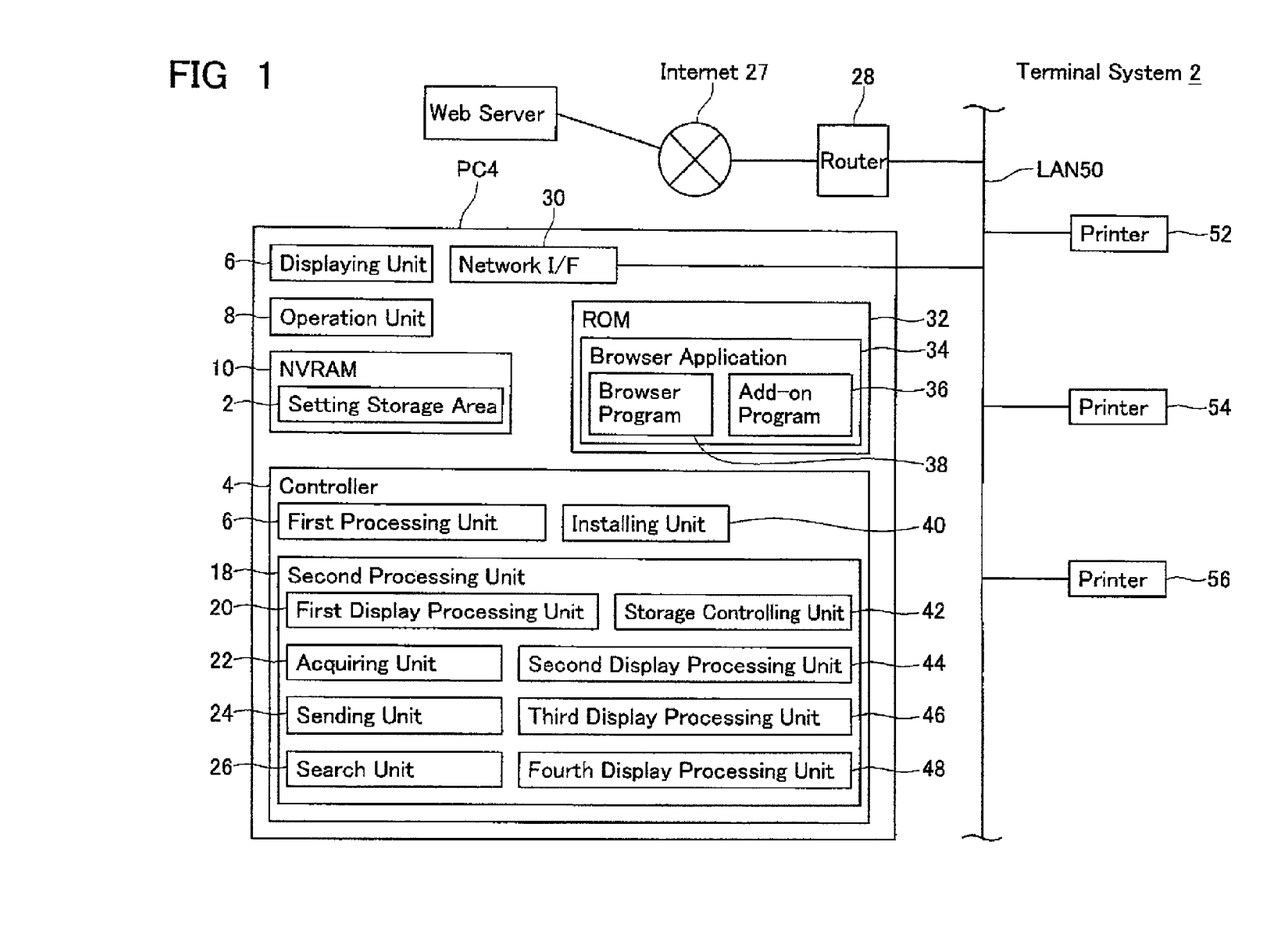
FIG. 1 shows an example of a configuration of a terminal system.

An embodiment is now explained with reference to the attached drawings. FIG. 1 shows a schematic diagram of a terminal system 2 of this embodiment. The terminal system 2 comprises a PC 4, an internet 27, a router 28, a LAN 50, and a plurality of printers 52 to 56. The PC 4 and the printers 52 to 56 are connected to the LAN 50. The PC 4 and the respective printers 52 to 56 are mutually communicable via the LAN 50. The LAN 50 is connected to the internet 27 via the router 28. The PC 4 is able to access the internet 27 via the LAN 50 and the router 28. Each printer 52 to 56 is a device at least including a print function. Each printer 52 to 56 may also be a multi-function device additionally including a scanner function, copy function, FAX function, telephone function, and other functions. The plurality of printers 52 to 56 has the same configuration.

(Configuration of PC 4)

The configuration of the PC 4 is now explained. The PC 4 comprises a displaying unit 6, an operation unit 8, an NVRAM 10, a controller 14, a network interface 30, and a ROM 32. The displaying unit 6 is a display for displaying various types of information. The operation unit 8 is configured from a keyboard and a mouse. A user is able to input various commands into the PC 4 by operating the operation unit 8. The NVRAM 10 is a nonvolatile memory, and includes a setting storage area 12. The setting storage area 12 stores the browser print conditions of the printer (for example, the printer 52) that is connected to the LAN 50. The browser print conditions will be described later in detail. The network interface 30 is connected to the LAN 50. The ROM 32 stores the browser application 34. The browser application 34 includes a browser program 38 and an add-on program 36. Incidentally, the ROM 32 additionally stores an OS (Operating System) program not shown.

The controller 14 is configured from a CPU. As a result of the controller 14 performing processes according to the browser program 38 and the add-on program 36 included in the browser application 34 stored in the ROM 32, the functions of the first processing unit 16 and the second processing unit 18 are realized. The first processing unit 16 displays a browser screen on the displaying unit 6 according to the browser program 38. The second processing unit 18 performs various processes according to the add-on program 36. As a result of the second processing unit 18 performing processes according to the add-on program 36, the functions of the first to fourth display processing units 20, 44 to 48, the acquiring unit 22, the sending unit 24, the search unit 26, and the storage controlling unit 42 are realized. In addition, as a result of the controller 14 performing processes according to the OS program stored in the ROM 32, the function of the installing unit 40 is realized. If the add-on program 36 is not included in the browser application 34, the installing unit 40 installs the add-on program 36 to the browser application 34.

(Explanation of Browser Print Screen and Printer Search Screen)

A browser screen 60 and a printer search screen 80 that are displayed on the displaying unit 6 of the PC 4 are now explained with reference to FIG. 2. Displayed on the displaying unit 6 of the PC 4 are the browser screen 60, the printer search screen 80, a browser print screen 90, and a browser print setting screen 100. Incidentally, the browser print screen 90 and the browser print setting screen 100 will be explained with reference to the printing process described later. The first processing unit 16 displays the browser screen 60 (browser window 60) on the displaying unit 6 according to the browser program 38 (refer to FIG. 1). There is no particular limitation in the type of browser. The second processing unit 18 displays the printer search screen 80, the browser print screen 90 and the browser print setting screen 100 on the displaying unit 6 according to the add-on program 36. Incidentally, the printing via the browser without using the printer driver will be referred to as "browser print" in the ensuing explanation.

Figure 2:
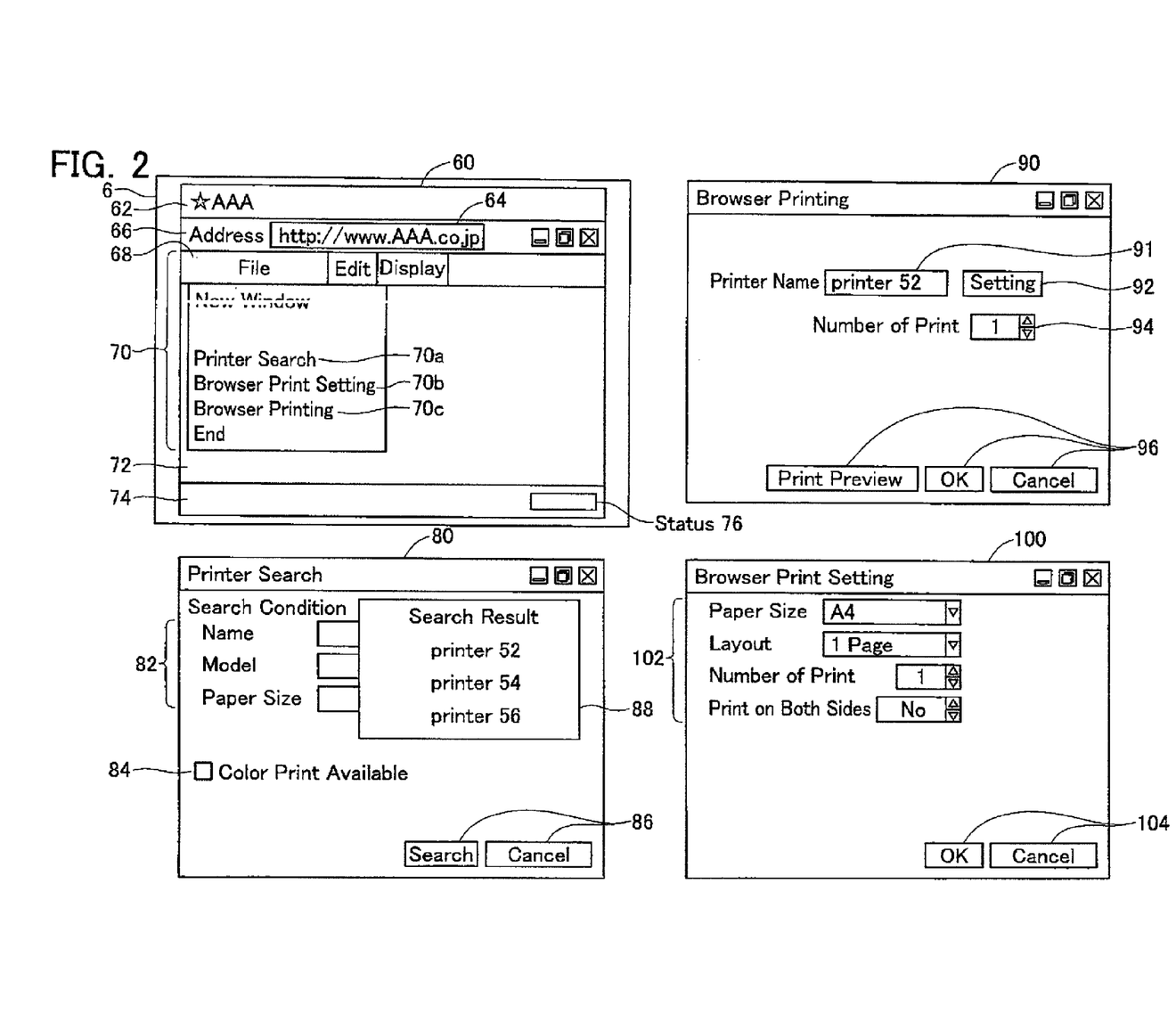
FIG. 2 is a diagram explaining respective screens that are displayed on a displaying unit.

The upper left diagram in FIG. 2 shows an example of the layout of the browser screen 60. The browser screen 60 includes a title bar 62, an address bar 66, a menu bar 68, a view 72, and a status bar 74. The title bar 62 displays the name of the web page ("AAA" in the example of FIG. 2) that is displayed on the view 72. The address bar 66 displays the address 64 of the web page that is displayed on the view 72. The menu bar 68 displays a list of menus that can be performed on the browser screen 60. The view 72 displays the web page. The status bar 74 displays the reading status of the web page. In a state where the add-on program 36 is not installed to the browser application 34, the status 76 is not displayed at the right end of the status bar 74. In a state where the add-on program 36 is installed to the browser application 34, the third display processing unit 46 displays the status 76 of the printer that is set as the default printer in the setting process described later at the right end of the status bar 74. In a state where the browser screen 60 is activated, the second processing unit 18 sends an SNMP (Simple Network Management Protocol) status request command to the default printer at predetermined time cycle. The PC 4 thereby acquires the status of the default printer. For example, in a state where the PC 4 is communicable with the default printer, "online" is displayed as the status 76. In a state where the PC 4 is not communicable with the default printer, "offline" is displayed as the status 76. In a state where some kind of error has occurred in the default printer, "error" is displayed as the status 76. In a state where printing is performed in the default printer, "printing" is displayed as the status 76. Moreover, if the printing is completed in the default printer, "print complete" is displayed as the status 76 for a predetermined time after the completion of printing.

When the user operates "file" from the menu bar 68, a button group 70 is displayed below the "file" menu. In a state where the add-on program 36 is not installed to the browser application 34, of the button group 70 shown in FIG. 2, only a specific button group other than the buttons 70a, 70b, 70c is displayed. In a state where the add-on program 36 is installed to the browser application 34, the first display processing unit 16 displays the buttons 70a, 70b, 70c in addition to the specific button group. The button 70a is a button for displaying the printer search screen 80. The button 70b is a button for displaying the browser print setting screen 100. The button 70e is a button for displaying the browser print screen 90.

The printer search screen 80 is now explained. When the button 70a is operated by the user, the second display processing unit 44 (refer to FIG. 1) displays the printer search screen 80 on the displaying unit 6. The lower left drawing in FIG. 2 shows an example of the layout of the printer search screen 80. The printer search screen 80 is a screen for searching for the printer to be set as the default printer. The printer search screen 80 includes a column 82 for inputting the search conditions, a column 84 for inputting the additional conditions, and a command button group 86. The user is able to input the search conditions into the column 82 by operating the operation unit 8. The printer name (node name), model name and paper size are input into the search condition column. The user is able to input detailed search conditions into the additional condition column 84 by operating the operation unit 8. Information showing whether color printing is possible is input into the additional condition column 84.

The user is able to operate (for instance, click) the search button of the command button group 86 by operating the operation unit 8. In this case, the search unit 26 (refer to FIG. 1) broadcasts a predetermined command (for example, GET command of SNMP) to the LAN 50. Consequently, the plurality of printers 52, 54, 56 connected to the LAN 50 sends a response to the PC 4, respectively in accordance with the predetermined command, including one's node name, one's model name, one's IP address, type of format that it can interpret, and other information. The search unit 26 thereby acquires the responses from the plurality of printers 52, 54, 56. The above other information includes information on the print paper size that can be printed by the printer, and whether the printer is able to perform color printing. The search unit 26 determines, for each of the plurality of responses, whether the information (node name, model name, paper size and so on) included in the relevant response satisfies all of the conditions that were input into the column 82 and the column 84. The search unit 26 specifies the node name that is included in the response to which a positive determination has been given. Subsequently, the second display processing unit 44 displays the search result screen 88 including a list of node names specified with the search unit 26 on the displaying unit 6. The user is able to select one printer from the list of printers (node names) displayed on the search result screen 88 by operating the operation unit 8. When the user selects one printer, the storage controlling unit 42 (refer to FIG. 1) sets the selected printer as the default printer. Specifically, the storage controlling unit 42 stores all information (node name, model name, IP address, type of format that can be interpreted, and so on) included in the response from the selected printer in the setting storage area 12 of the NVRAM 10.

(Setting Process that is Performed by the PC 4)

The setting process that is performed by the controller 14 of the PC 4 is now explained with reference to FIG. 3. The user is able to perform a predetermined operation for activating the browser application 34 with the operation unit 8 of the PC 4. In this case, the first processing unit 16 displays the browser screen 60 (refer to FIG. 2) on the displaying unit 6 according to the browser program 38. The user is able to perform operations for acquiring the add-on program 36 on the browser screen 60. In this case, the installing unit 40 downloads the add-on program 32 from the specific site on the internet 27 (S2). Subsequently, the installing unit 40 installs the downloaded add-on program 32 to the browser application 34 (S4). More specifically, the installing unit 40 installs the add-on program 32 as an extension program of the browser application 34.

Subsequently, the search unit 26 searches for printers that are connected to the LAN 50 (S6). Specifically, the search unit 26 broadcasts the predetermined command to the LAN 50. Consequently, the plurality of printers 52, 54, 56 each sends to the PC 4 a response including one's node name, one's model name, one's IP address, the type of format that it can interpret, and other information. The search unit 26 determines whether any response was received (S8). If the determination is YES, the controller 14 continues to S10. If the determination is NO, the setting process is ended.

At S10, the search unit 26 determines whether a plurality of responses was received. If the determination is YES, the routine proceeds to S12. If the determination is NO, the controller 14 continues to S14. At S12, the search unit 26 specifies the node name from each of the plurality of responses, and displays the search result screen 88 (refer to FIG. 2) including a list of the specified plurality of node names on the displaying unit 6. By operating the operation unit 8, the user is able to select one printer from the list of printers (node names) displayed on the search result screen 88. When the user selects one printer, the storage controlling unit 42 sets the selected printer as the default printer (S14). The process of S14 is the same as the setting of the default printer explained with reference to the printer search screen 80 of FIG. 2. Incidentally, if the determination is NO at S10, at 814, the search unit 26 sets the one printer to which the response was sent as the default printer.

(Printing Process that is Performed by the PC 4)

The printing process that is performed by the PC 4 is now explained with reference to FIG. 4. The user is able to input the address of the desired web server in the address bar 66 (refer to FIG. 2) on the browser screen 60. The first processing unit 16 thereby acquires data from the web server according to the browser program 38. The data acquired here includes, for example, the HTML (Hyper Text Markup Language) format. The first processing unit 16 displays the data on the view 72 on the browser screen 60. The user operates "file" in the menu bar 68. In the above case, the first display processing unit 20 displays the button group 70 including buttons 70a, 70b, 70c according to the add-on program 36. The printing process is completed when the user operates the button 70c. In the above case, the fourth display processing unit 48 displays the browser print screen 90 (refer to FIG. 2) on the displaying unit 6. The browser print screen 90 is a separate screen (that is, a separate window) from the browser screen 60.

The browser print screen 90 is now explained. The upper right diagram in FIG. 2 shows an example of the layout of the browser print screen 90. The browser print screen 90 is a screen for inputting commands for starting the browser print. The browser print screen 90 includes a default printer display column 91, a setting button 92, a number of print setting column 94, and a command button group 96. The node name of the current default printer that was set via the setting process of FIG. 3 or the printer search screen 80 of FIG. 2 is displayed on the column 91. The setting button 92 is a button for displaying the browser print setting screen 100 (refer to FIG. 2). The column 94 is a column for setting the number of browser prints. The user is able to input the number of prints in the column 94. When the print preview button of the command button group 96 is operated by the user, the preview print screen of the data displayed on the view 72 is displayed. When the OK button of the command button group 96 is operated by the user, the printing process described later is started.

The contents of the printing process are now explained. When the printing process is started, it enters a user operation waiting state. As shown in FIG. 4, if the OK button of the command button group 96 is operated by the user in the browser print screen 90 (S16: YES), the second processing unit 18 proceeds to S24. Moreover, if the setting button 92 is operated by the user in the browser print screen 90 (S18: YES), the second processing unit 18 proceeds to the browser print setting process (S20). If a button (for example, the print preview button, cancel button or the like) other than the OK button and the setting button is operated, the process according to the button operated by the user is performed (S19).

In the browser print setting process, the fourth display processing unit 48 displays the browser print setting screen 100 (refer to FIG. 2) on the displaying unit 6. The browser print setting screen 100 is now explained. The lower right drawing in FIG. 2 shows an example of the layout of the browser print setting screen 100. The browser print setting screen 100 is a screen for setting the printing conditions of the browser print. The browser print setting screen 100 includes a column 102 and a command button group 104. The column 102 is a column for inputting various printing conditions. By operating the operation unit 8, the user is able to input the printing conditions into the column 102. The paper size, layout (so-called 2 in 1, 4 in 1 and so on), number of prints, and with or without duplex printing are input into the column 102. As shown in FIG. 4, the second processing unit 18 waits until the printing conditions are input into the column 102 and one of the buttons of the command button group 104 is subsequently operated. When the user operates the OK button of the command button group 104 (S21: YES), the storage controlling unit 42 stores the printing conditions that were input into the column 102 in the setting storage area 12 in the NVRAM 10 (S23), and the controller 14 closes the browser print setting screen 100. Meanwhile, when the cancel button is operated (S22: YES), the controller 14 closes the browser print setting screen 100 without storing the printing conditions that were input into the column 102 in the setting storage area 12 in the NVRAM 10. When the browser print setting screen 100 is closed, it returns to the user operation waiting state as in the browser print screen 90.

Figure 3:
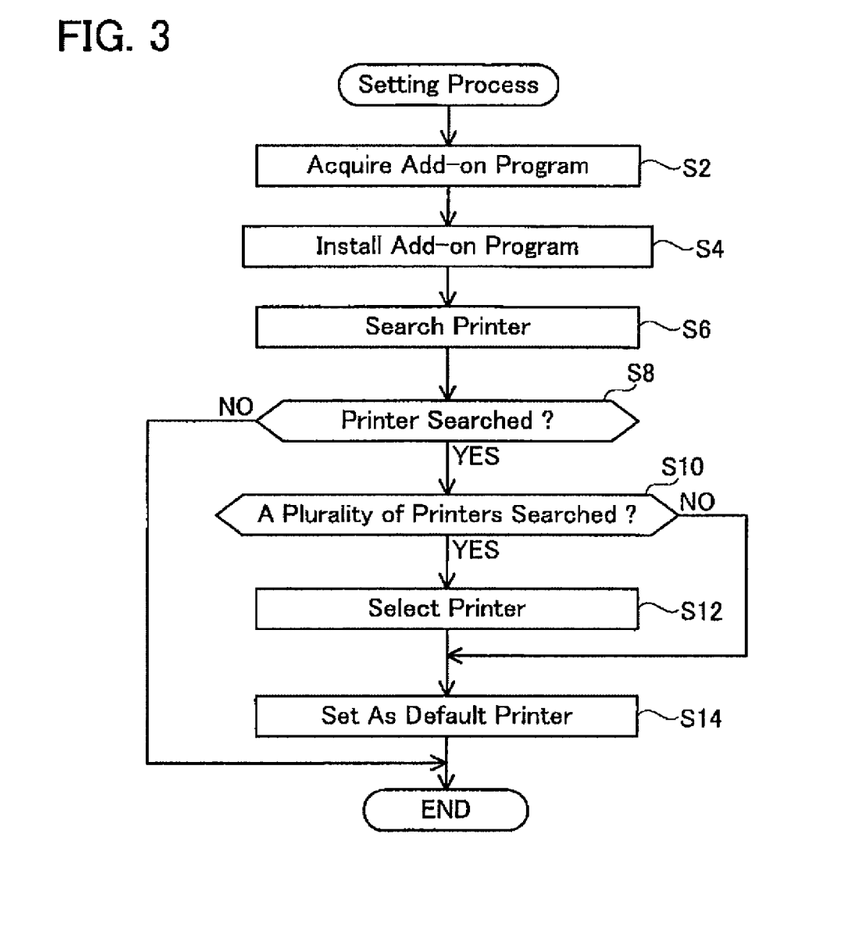
FIG. 3 shows a flowchart of a setting process that is performed by a terminal device.
Figure 4:
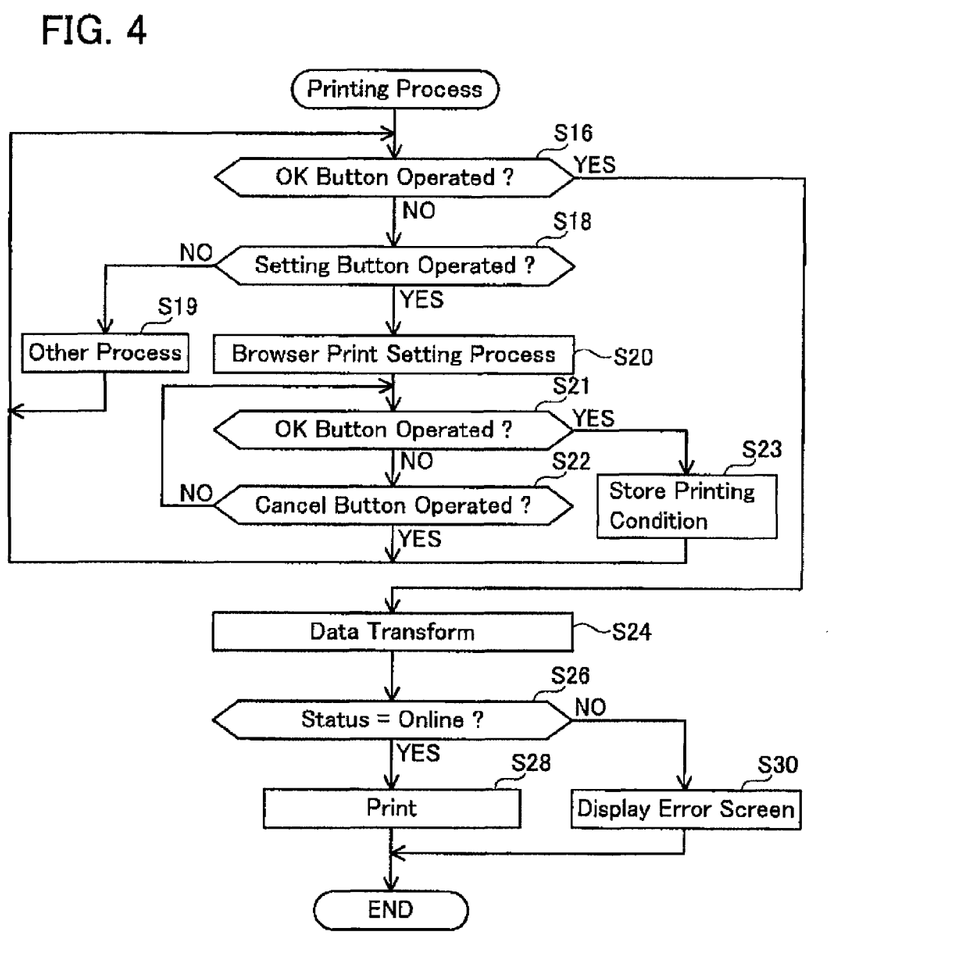
FIG. 4 shows a flowchart of a printing process that is performed by the terminal device.

At S24 of FIG. 4, the acquiring unit 22 reads a format (set via the setting process of FIG. 3 or the printer search screen 80 of FIG. 2) that can be interpreted by the default printer from the setting storage area 12 in the NVRAM 10. Subsequently, the acquiring unit 22 transforms the HTML format data that is displayed on the view 72 of the browser screen 60 (refer to FIG. 2) into the read format (for example, XML data, PDF data or the like). The acquiring unit 22 thereby acquires the transformed new data. Subsequently, the second processing unit 18 determines whether the status of the default printer is "online" (S26). This determination may be made, for example, by making inquiries to the default printer at the timing of performing the process of S26, or based on whether or not the status 76 displayed on the status bar 74 (refer to FIG. 2) of the browser screen 60 is "online." Here, if the determination at S26 is YES, the controller 14 continues to S28. If the determination is NO, the controller 14 continues to S30. At S28, the sending unit 24 reads the IP address of the default printer from the setting storage area 12 of the NVRAM 10. Moreover, the sending unit 24 reads the printing conditions that were input with the browser print setting screen 100 from the setting storage area 12 in the NVRAM 10. In addition, the sending unit 24 reads the number of prints that was input into the number of print setting column 94 of FIG. 2. In the ensuing explanation, the printing conditions read above and the number of prints are collectively referred to as the "specific printing conditions." The sending unit 24 sends the transformed new data and the specific printing conditions with the read IP address as the destination. Incidentally, the transformed new data is filed and sent according to a printing method set forth in the Web Service or UFO. The default printer (for example, the printer 52) receives the transformed new data and the specific printing conditions. The default printer prints the image that is represented by the transformed new data according to the specific printing conditions. Meanwhile, at S30, the second processing unit 18 displays an error screen on the displaying unit 6 (S30). When the process of S28 or S30 is performed, the printing process is completed.

If the button 70b of the browser screen 60 of FIG. 2 is operated, the fourth display processing unit 48 displays the browser print setting screen 100 (refer to FIG. 2) on the displaying unit 6. When the printing conditions are input into the column 102 and the OK button of the command button group 104 is subsequently operated, the storage controlling unit 42 stores the printing conditions that were input into the column 102 in the setting storage area 12 of the NVRAM 10. The printing conditions in the setting storage area 12 are thereby updated.

The terminal system 2 of this embodiment was explained in detail above. In this embodiment, the first display processing unit 20 displays the browser print button 70c on the browser screen 60. When the browser print button 70c is operated and the OK button of the browser print screen 90 is subsequently operated, the acquiring unit 22 acquires transformed new data from the data that is displayed on the view 72 of the browser screen 60. The sending unit 24 sends the transformed new data to the default printer. Consequently, the default printer performs printing according to the transformed new data. According to this embodiment, the image that is represented by the data displayed on the browser screen 60 can be printed without having to use a printer driver.

Moreover, in this embodiment, the acquiring unit 22 transforms the HTML data that is displayed on the view 72 of the browser screen 60 into a format that can be interpreted by the printer. Since the transforming process can be performed by the PC 4 itself, it is not necessary to request another device to perform the transforming process.

In this embodiment, the installing unit 40 is able to install the add-on program 36 to the browser application 34. Thus, if the add-on program 36 is not installed, such add-on program 36 can be installed to the browser application 34 thereby.

In this embodiment, the search unit 26 searches for a printer that is connected to the LAN 4. The storage controlling unit 42 sets the searched printer as the default printer. Information concerning the destination printer of the transformed new data can thereby be stored in the setting storage area 12.

Moreover, in cases where the search unit 26 searches for a plurality of printers, the second display processing unit 44 displays the search result screen 88. The user is able to select a desired default printer among the plurality of printers.

In this embodiment, the third display processing unit 46 displays the status 76 on the browser screen 60. Thus, the user is able to know the status information of the default printer by viewing the browser screen 60. The user is able to determine whether or not to operate the browser print button 70c (that is, whether or not to cause the default printer to perform printing) based on the status information.

Moreover, in this embodiment, the fourth display processing unit 48 displays the browser print setting screen 100 for the user to select the printing conditions on the displaying unit 6. In addition, the sending unit 24 sends the specific printing conditions including the printing conditions selected by the user, and the transformed new data to the default printer. Thus, the user is able to cause the default printer to perform printing according to the desired printing conditions.

The browser program 38 is an example of the "first program." The add-on program 36 is an example of the "second program." The data that is displayed on the view 72 is an example of the "specific data." The buttons 70a, 70b, 70c are an example of the "predetermined inputting portion." The default printer is an example of the "specific printer." The transformed new data is an example of the "new specific data." The setting storage area 12 is an example of the "specific storage area." Accordingly, the NVRAM 10 and the ROM 32 are an example of the "memory." Moreover, the browser print setting screen is an example of the "print setting selection screen." The controller 14 is an example of the "processor."

The modified examples of the above embodiment are listed below.

(1) The first display processing unit 20 may also display a so-called tool bar at a part of the browser screen 60 according to the add-on program 36. In the above case, the tool bar may include buttons 70a, 70b, 70c for respectively displaying the printer search screen 80, the browser print screen 90, and the browser print setting screen 100.

(2) The installing unit 40 does not have to acquire the add-on program 36 from the internet 27 at S2 of FIG. 3. For example, the installing unit 40 may alternately acquire the add-on program 36 from a storage medium (CD-ROM or the like) storing the add-on program 36.

(3) In substitute for S24 of FIG. 4, the acquiring unit 22 may send the HTML data displayed on the view 72 and information showing the format that can be interpreted by the default printer to other device. The other device may transform the HTML data into the above format and send the transformed new data to the PC 4. The acquiring unit 22 may also acquire the transformed new data by receiving the transformed new data.

(4) In this embodiment, the PC 4 is an example of the "terminal device." Nevertheless, the technique of this embodiment may alternately be applied to other types of terminal devices. The technique of this embodiment may be applied to, for example, a TV, a game machine and the like.

What is claimed is:

1. A terminal device configured to be connected with an internet, the terminal device comprising:
a memory configured to store a browser application including a first program and a second program, the first program being a browser program configured to display a browser screen on a display unit and the second program being an add-on program configured to be installed to the browser application and to print an image represented by data displayed in the browser screen; and
a processor comprising a first processing unit and a second processing unit; wherein
the first processing unit configured to acquire specific data representing a specific image from the internet in accordance with the first program and to display a specific browser screen including the specific data on the displaying unit in accordance with the first program; and
the second processing unit configured to execute a process in accordance with the second program, wherein
the second processing unit comprises:
a first display processing unit configured to display a specific area in the specific browser screen when a specific menu bar on the specific browser screen is operated by a user, wherein
if the second program is installed to the browser, a plurality of buttons are displayed in the specific area in accordance with the second program and one or more buttons are displayed in the specific area in accordance with the first program,
the plurality of buttons include a predetermined inputting button and a first inputting button, the predetermined inputting button is configured to be operated to initiate a process for printing the specific image, the first inputting button is configured to be operated to initiate a process for selecting a print setting, and if the second program is not installed to the browser, the one or more buttons are displayed in the specific area without displaying the plurality of buttons;

a setting selection screen display unit configured to display a print setting selection screen on the displaying unit when the first inputting button is operated, the print setting selection screen being configured to allow the user to select a specific print setting;

an acquiring unit configured to acquire new specific data representing the specific image by transforming the specific data to the new specific data in accordance with the second program when the predetermined inputting button is operated, the new specific data being transformed from the specific data being displayed on the specific browser screen, the new specific data having a specific format that a specific printer can interpret; and a sending unit configured to send print setting information indicating the specific print setting selected by the user and the new specific data to the specific printer.

2. The terminal device as in claim 1, wherein the terminal device is configured to be connected with the internet via a local area network;

the plurality of buttons further include a second inputting button, the second inputting button being configured to be operated to initiate a process for searching one or more printers that are connected with the local area network; and the second processing unit further comprises:

a search unit configured to search one or more printers being connected with the local area network when the second inputting button is operated; and a storage controlling unit configured to store printer information related to the specific printer among the one or more printers in a specific storage area in the memory, wherein the sending unit is configured to send the new specific data to the specific printer by using the printer information being stored in the specific storage area in the memory.

3. The terminal device as in claim 2, wherein the second processing unit further comprises a second display processing unit configured to display a printer selection screen on the displaying unit when a plurality of printers is searched by the search unit, the printer selection screen allowing the user to select one printer among the plurality of printers, and the storage controlling unit is configured to store the printer information related to the specific printer selected by the user in the specific storage area.

4. The terminal device as in claim 1, wherein the second processing unit further comprises a third display processing unit configured to display status information of the specific printer on the browser screen.

5. A non-transitory computer readable medium storing a computer program configured to be installed to a browser application as an add-on program, to display a browser screen on a display unit, and to print an image represented by data displayed in the browser screen, the computer program including instructions for ordering a computer mounted on a terminal device configured to be connected with an internet to execute:

displaying a specific area in a specific browser screen when a specific menu bar on the specific browser screen is operated by a user, wherein if the second program is installed to the browser, a plurality of buttons are displayed in the specific area in accordance with the second program and one or more buttons are displayed in the specific area in accordance with the first program, the plurality of buttons include a predetermined inputting button and a first inputting button, the predetermined inputting button is configured to be operated to initiate a process for printing the specific image, the first inputting button is configured to be operated to initiate a process for selecting a print setting, and if the second program is not installed to the browser, the one or more buttons are displayed in the specific area without displaying the plurality of buttons;

displaying a print setting selection screen on the displaying unit when the first inputting button is operated, the print setting selection screen being configured to allow the user to select a specific print setting;

acquiring new specific data representing the specific image by transforming the specific data to the new specific data in accordance with the computer program when the predetermined inputting button is operated, the new specific data being transformed from specific data displayed on the specific browser screen, the new specific data having a specific format that a specific printer can interpret; and sending print setting information indicating the specific print setting selected by the user and the new specific data to the specific printer.

6. The non-transitory computer readable medium as in claim 5, wherein in the acquiring, the new specific data is acquired by transforming the specific data to the new specific data.

7. The non-transitory computer readable medium as in claim 5, wherein the terminal device is configured to be connected with the internet via a local area network;

the plurality of buttons further include a second inputting button, the second inputting button being configured to be operated to initiate a process for searching one or more printers that are connected with the local area network;

the computer program further includes instructions for ordering the computer to execute:

searching one or more printers being connected with the local area network when the second inputting button is operated; and storing printer information related to the specific printer among the one or more printers in a specific storage area in a memory of the terminal device;

wherein in the sending, the new specific data is sent to the specific printer by using the printer information being stored in the specific storage area.

8. The non-transitory computer readable medium as in claim 7, wherein the computer program further includes instructions for ordering the computer to execute:

displaying a printer selection screen on a displaying unit of the terminal device when a plurality of printers is searched, the printer selection screen allowing a user to select one printer among the plurality of printers, and wherein in the storing, the printer information related to the specific printer selected by the user is stored in the specific storage area.

9. The non-transitory computer readable medium as in claim 5, wherein the computer program further includes instructions for ordering the computer to execute:

displaying status information of the specific printer on the browser screen.

* * * * *